(12) United States Patent
Chiodo

(10) Patent No.: US 7,784,429 B2
(45) Date of Patent: Aug. 31, 2010

(54) CONTOURED SPECIMEN HOLDER FOR IMAGING MACHINES

(76) Inventor: Chris D. Chiodo, 29277 Newport, Warren, MI (US) 48093

( * ) Notice: Subject to any disclaimer, the term of this patent is extended or adjusted under 35 U.S.C. 154(b) by 773 days.

(21) Appl. No.: 11/526,115

(22) Filed: Sep. 22, 2006

(65) Prior Publication Data

US 2008/0072836 A1    Mar. 27, 2008

(51) Int. Cl.
A01K 29/00 (2006.01)
A61D 3/00 (2006.01)

(52) U.S. Cl. ........... 119/417; 119/755
(58) Field of Classification Search ........ 119/419, 119/420, 417, 752, 756, 755, 726, 751; 220/4.21, 220/913, 780, 784; 206/463, 470, 471, 484; 128/845, 869, 870, 873
See application file for complete search history.

(56) References Cited

U.S. PATENT DOCUMENTS

| | | | | | |
|---|---|---|---|---|---|
| 1,398,484 | A | * | 11/1921 | Holding | 119/752 |
| 1,956,499 | A | * | 4/1934 | Dworetzky | 119/729 |
| 2,504,679 | A | * | 4/1950 | Goldfarb | 446/298 |
| 2,540,650 | A | * | 2/1951 | Brosene, Jr. et al. | 119/751 |
| 3,300,040 | A | * | 1/1967 | Ferguson | 206/457 |
| 3,428,030 | A | * | 2/1969 | Updegraff | 119/752 |
| 3,776,375 | A | * | 12/1973 | Rohdin | 206/459.5 |
| 4,269,149 | A | * | 5/1981 | Thomas | 119/729 |
| 4,721,060 | A | * | 1/1988 | Cannon et al. | 119/420 |
| 4,781,150 | A | * | 11/1988 | Phillips | 119/751 |
| 5,020,478 | A | * | 6/1991 | Salvatore | 119/752 |
| 5,068,921 | A | * | 12/1991 | Jones | 2/2.5 |
| 5,320,069 | A | * | 6/1994 | Anderson et al. | 119/751 |
| 5,823,146 | A | * | 10/1998 | Alaniz et al. | 119/725 |
| 5,839,393 | A | * | 11/1998 | Rupp et al. | 119/712 |
| 5,927,234 | A | * | 7/1999 | Siegel | 119/751 |
| 5,996,537 | A | * | 12/1999 | Caditz | 119/850 |
| 6,651,587 | B1 | * | 11/2003 | DeFord et al. | 119/420 |
| 7,146,936 | B2 | * | 12/2006 | Dazai et al. | 119/756 |
| 7,603,966 | B1 | * | 10/2009 | Beebe | 119/755 |
| 2003/0136354 | A1 | * | 7/2003 | Remmler | 119/755 |
| 2005/0077076 | A1 | * | 4/2005 | Eckstein et al. | 174/200 |

* cited by examiner

Primary Examiner—Yvonne R. Abbott
(74) Attorney, Agent, or Firm—Lawrence J. Shurupoff

(57) ABSTRACT

A low cost specimen holder for accurately positioning an animal or other specimen in an imaging machine is constructed from two thin sheets of formed plastic. Each sheet can be formed with a half cavity corresponding to the size and shape of a rodent or other laboratory animal or specimen. To minimize diffraction of imaging beams, one of the sheets can be formed to accommodate the entire specimen, and the other sheet can be substantially planar. The two sheets may be snap-fit or press-fit together to closely hold or encapsulate a specimen with the resulting cavity.

15 Claims, 9 Drawing Sheets

CONTOURED SPECIMEN HOLDER FOR IMAGING MACHINES

BACKGROUND OF THE INVENTION

1. Field of the Invention

The present invention relates in general to a low cost preformed retainer for securely holding a specimen in position during any of various imaging procedures including X-ray, CT, MRI and PET.

2. Description of Prior Developments

Laboratory research animals such as rats, mice and other rodents are commonly scanned and imaged with virtually every type of imaging apparatus available. During imaging, it is important to accurately position a specimen in an imaging field. It is also desirable to be able to repeatably place the same specimen in the same position over varying time periods to monitor various physiological developments in the specimen such as tumor growth and to duplicate and verify previous imaging results.

Prior positioning devices have been developed for holding specimens in place during imaging, however these devices are typically complex in structure and quite costly. What is needed is a low cost specimen holder having a simple construction which eliminates many of the complex structures found in prior specimen holders.

SUMMARY OF THE INVENTION

The present invention has been developed to satisfy the needs noted above. A simple, inexpensive and potentially disposable specimen holder has been designed as a hollow plastic transparent retainer having a shaped recess generally matching the contours and profile of an animal or specimen being imaged. The retainer can be molded from optically clear or optically transparent plastic materials such as polycarbonate.

Instead of encapsulating the specimen within a body-shaped cavity, a molded support structure can alternatively be formed on the specimen retainer for anchoring portions of a specimen in a fixed predetermined position. For example, a tooth bar can be shaped on the retainer for positioning the specimen's head, and contoured complementary holders can be formed to wedge and hold the specimen's legs and body in a predetermined fixed position.

The specimen retainer can include a pair of matched mating plastic moldings which can be snapped, pressed, folded or otherwise secured together so as to sandwich, wedge and/or clamp a specimen between the moldings in a preferred orientation. A gasket can be mounted around the perimeter of the specimen holder to provide a hermetic seal against contamination. It is also possible to form a filter in the shape of a porous perimeter gasket around the junction or interface between the mating halves of the specimen retainer so as to surround the specimen and allow the specimen to breath without contamination to or from the surrounding environment.

A further enhancement of the invention includes the incorporation of a connector portion on the specimen retainer. The connector portion communicates with the internal cavity within which the specimen is held. This allows for the passage of anesthesia gasses into and/or out of the cavity, as well as passage of electrical leads for sensors connected to the specimen.

In some forms of optical imaging, light must pass freely and without distortion through the specimen holder in order to cause the specimen to glow or fluoresce. In this case, it is desirable for the outer surface of the specimen holder to be planar. This can be achieved with a two-piece specimen holder having one half formed as a planar sheet for uniformly transmitting or passing light and the other half deeply contoured to receive the entire specimen.

Pockets can be formed in the specimen holder for receiving sensors such as ECG pads and respiratory sensors known as "pillows". Grooves or channels can also be formed in the specimen holder for accommodating electrical leads and fluid tubing communicating with the sensors. A living hinge can be formed between the two portions of the mold so as to provide a one-piece molding. This economical one-piece construction can be produced as a single-use disposable retainer.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts through the several views and wherein.

DETAILED DESCRIPTION OF THE PREFERRED EMBODIMENTS

The present invention will now be described in conjunction with the drawings, beginning with FIG. 1 which shows a first embodiment of a specimen holder 10 having an upper or first shroud or retainer portion 12 and a lower or second shroud or retainer portion 14. Each retainer portion 12, 14 can be formed of an inexpensive plastic sheet material and vacuum formed over a heated mold having a shape resembling each respective portion of a specimen to be retained in holder 10. The retainer portions 12, 14 can alternatively be formed by a stamping operation, injection molding or even using light-activated liquid plastic forming techniques such as SLA and SLS.

Figure 1:
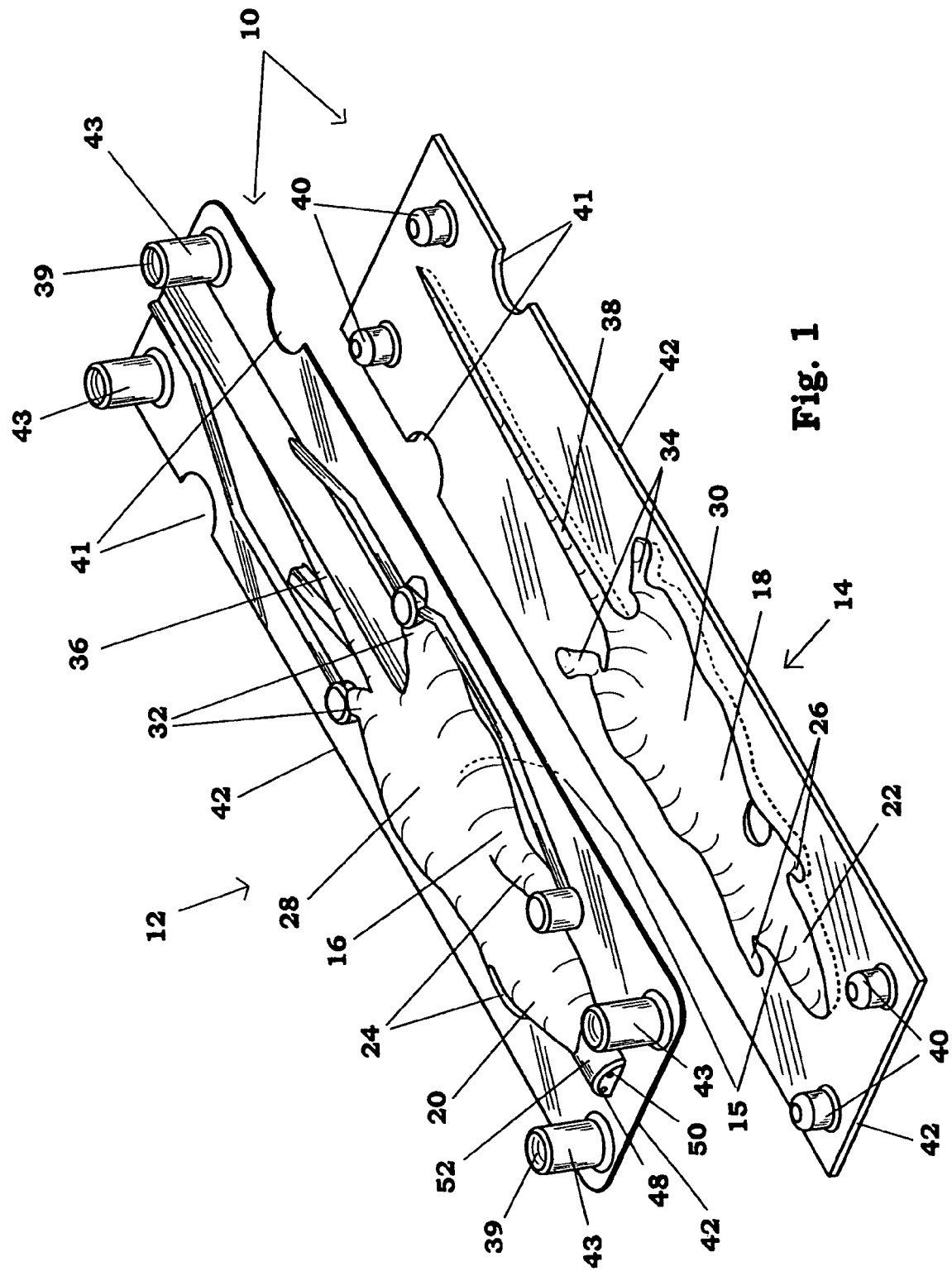
FIG. 1 is an exploded perspective view of a first embodiment of the invention.

As further seen in FIG. 1, one of the retainer portions 12 is formed with a pocket or recess 16 shaped similar to the upper half portion of a rodent, such as a mouse or rat. The other retainer portion 14 is formed with a pocket or recess 18 shaped similar to the lower half portion of a rodent. While rodent shapes are used as examples in the drawing figures, any desired specimen shape can be formed on portions 12, 14, such as a small monkey or other small animal. Together, the upper and lower retainer portions 12, 14, when properly aligned against one another, define an internal retention cavity 15 having a shape substantially the same as or at least analogous or similar to that of a specimen to be placed therein.

The retention portions 12, 14 include respective upper and lower head half cavities 20, 22, upper and lower front leg half cavities 24, 26, upper and lower body half cavities 28, 30, upper and lower rear leg half cavities 32, 34 and upper and lower tail half cavities 36, 38. In order to properly and accurately align the pockets or recesses 16, 18 to form a single matched complementary specimen cavity 15, keying sockets or holes 39 and keying lower retainer portions 12, 14. Notched edges 41 and/or formed hollow pegs 43 can also be used for aligning the holder 10 in a complementary mounting structure in an imaging bracket or mounting assembly in an imaging machine.

That is, when the specimen holder 10 is assembled as an integral unit in which a specimen is tightly secured, encapsulated and clamped between the upper and lower retainer portions 12, 14, the holder 10 may be accurately mounted on an imaging machine by placing the keying holes 39, and/or optional matching alignment notches 41 and/or pegs 43 on complementary registration features or forms on an imaging machine. Of course, any other type of keying and alignment features may be cut or formed on the specimen holder 10 to engage complementary keying features on an imaging machine or mounting assembly of an imaging machine.

The upper and lower retainer portions 12, 14 may be further secured and locked tightly together with molded or formed pegs provided on one retainer portion 12. Enlarged heads on the pegs can be sized to permanently snap fit into matching pockets on the other retainer portion 14. This arrangement is primarily intended for single use disposable holders wherein the specimen can be permanently encapsulated and discarded within the specimen holder 10 after imaging. Any other type of connection may be used such as tongue and groove or adhesively bonded connections which may surround the internal cavity 15 and the entire periphery of the planar edge portions 42.

If needed, intake breathing and exhale and exhaust ports 48, 50 may be formed within a semi cylindrical internal nose cavity or trough 52 leading from the front portion of half portion 12 into the head half cavities 20, 22. Air or anesthesia gas may be admitted or pumped into the head cavities 20, 22 through one or more ports 48, 50 to provide oxygen and other gasses to the specimen and to extract spent gasses from the head cavities.

Figure 2:
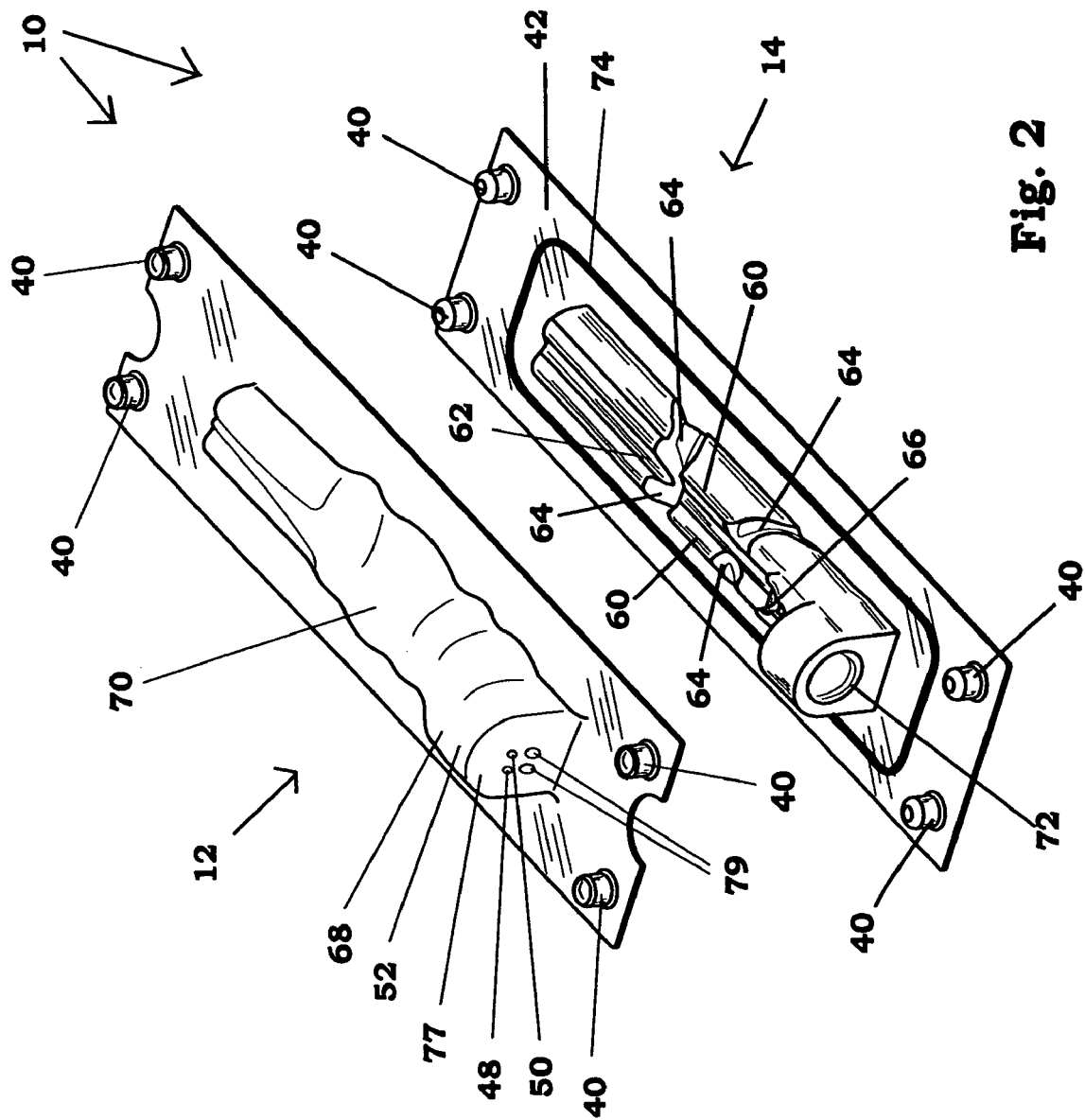
FIG. 2 is an exploded perspective view of a second embodiment of the invention.

Another embodiment of the invention is shown in FIG. 2 wherein the specimen holder 10 does not form an internal cavity 15 shaped substantially in the same form as the intended specimen, but instead is formed with supporting, retaining and positioning structures that limit the movement of the specimen between the retainer portions 12, 14. In this example, a pair of parallel raised hollow sidewalls 60 form or define between them a longitudinal channel 62 which serves as a walled bed within which a specimen may be tightly and accurately wedged. Channel 62 transversely centers and aligns a specimen within the holder 10.

Cutout recesses or openings 64 are formed through opposed sides of each sidewall 60 for snugly receiving the arms and legs of a specimen, thereby accurately fixing the specimen longitudinally within the holder 10. Additional positioning accuracy can be achieved by forming a small transverse wall or ridge 66 at the front end portion of the lower portion 14. Ridge 66 serves as a bite bar over which a rodent's front or incisor teeth may be placed in the manner of a tensioned hook to fix the rodent's head in a predetermined position.

That is, the head of the specimen may be held tightly in place, with its teeth hooked over the bite bar on ridge 66, by a somewhat semi-conical or wedge-shaped head cavity 68 formed on the upper half portion 12. This somewhat half-conical cavity 68 pushes or wedges down on the head of the specimen when the two half portions 12, 14 are superimposed and connected together. The remainder of the specimen is tightly constrained within the grooved bed (defined by channel 62) by a clamping force applied by a shallow upper body arched recess 70 that extends longitudinally rearwardly from cavity 68. Recess 70 is dimensioned to press against the back and rump of the specimen and hold it tightly within channel 62, while extending over and around sidewalls 60.

If desired, a circular opening 72 may be molded in the leading end of the lower half portion 14 for receiving a plug-type connector of the type having various gas and electrical connections for treating and monitoring the specimen. A HEPA or other type of filter may also be mounted in opening 72. Alternatively, or in addition to opening 72, an arched cavity defining a nose and mouth chamber 52 can be formed in the upper retainer portion 12 adjacent the front end of the holder 10 to receive a filter cartridge and/or a plug-type connector. One or more ports 48, 50 can be formed through the front wall 77 of the cavity 52 for receiving fluid flow tubing for administering anesthesia and other gasses to a specimen. Additional tubing can be connected to additional ports for inhalation and exhalation of gas as well as for heating and cooling air for stabilizing a live specimen. Additional ports 79 may be formed through the front wall 77 for electrical wires and leads for sensors and the like which can pass through opening 72 in the lower retainer portion 14.

As further seen in FIG. 2, a gasket 74 may be mounted around the entire peripheral edge 42 of either the upper or lower retainer portions 12, 14, (here shown on the lower portion). Gasket 74 may form a hermetic seal between the upper and lower retaining portions 12, 14 so as to prevent ambient contamination and internal cavity contamination to or from the specimen.

In some cases, the gasket 74 can be formed as a loop-shaped circumferential HEPA filter extending around, between and adjacent to the entire perimeter and interface of the upper and lower retainer portions. Alternatively, a circumferential bead of plastic, rubber or caulk-type material may be applied to one of the portions 12, 14 to form a circumferential seal or gasket. A tacky adhesive bead may alternatively be applied in the manner of a pre-gummed self-sealing envelope to form an interface seal when the two portions 12 and 14 are pressed together around a specimen.

Figure 3:
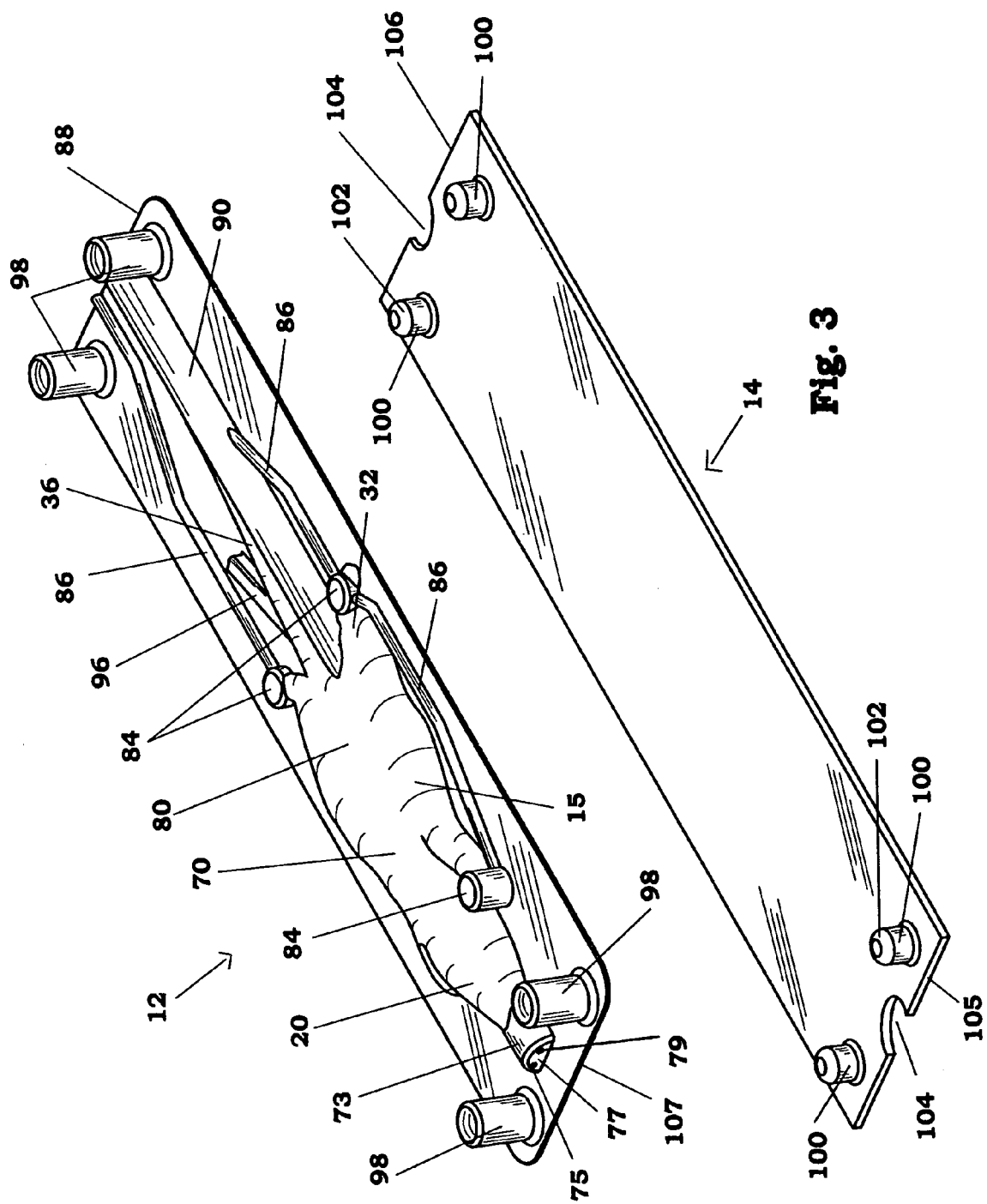
FIG. 3 is an exploded perspective view of a third embodiment of the invention.
Figure 4:
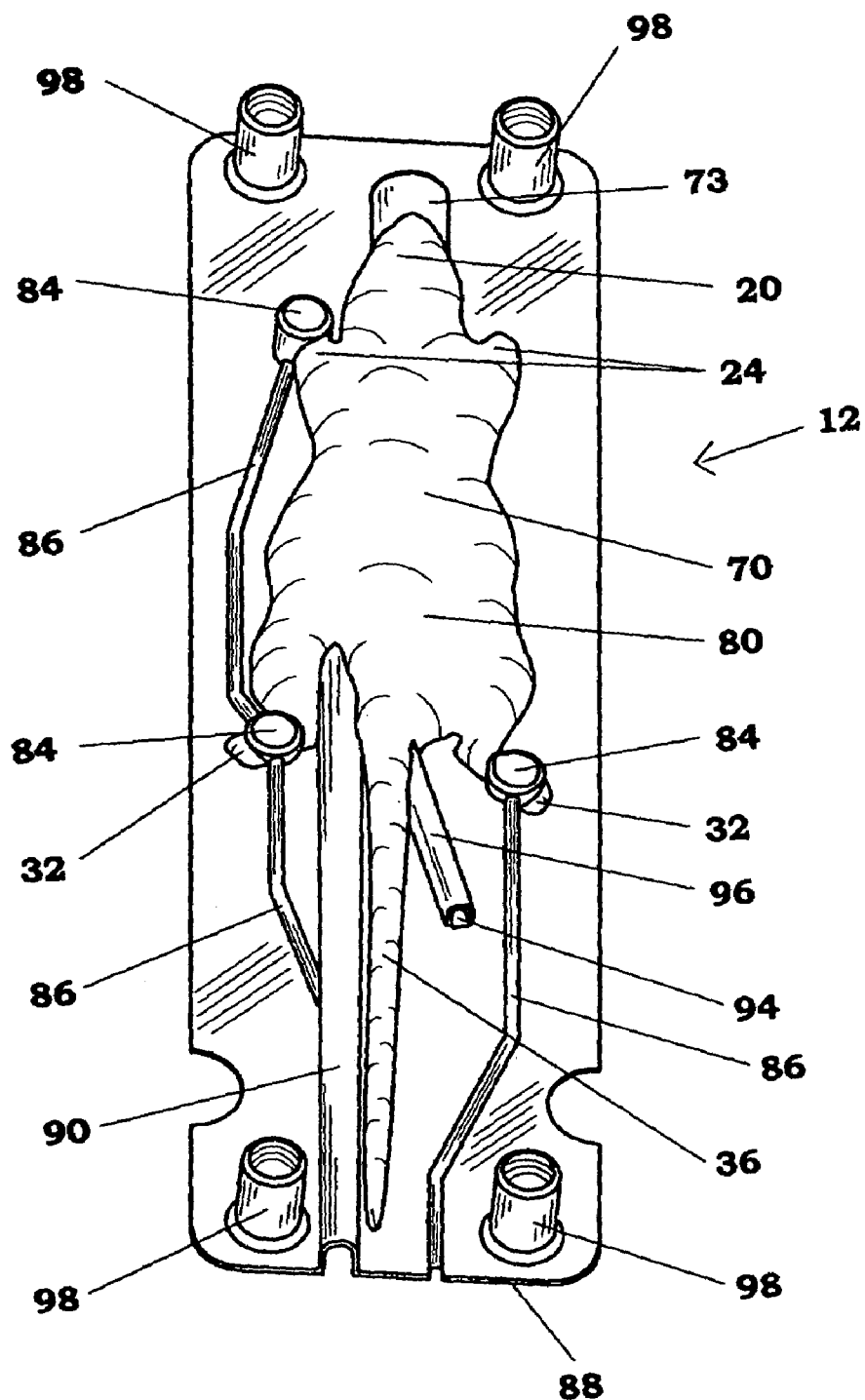
FIG. 4 is a top plan view of the upper retainer portion of FIG. 3.

Another embodiment of the invention is shown in FIGS. 3 and 4 where the lower portion 14 is simply a flat rectangular sheet and the upper portion 12 is formed with a cavity 15 sufficiently large to tightly accommodate the entire specimen. This embodiment is particularly well suited for optical imaging, wherein uniform light transmission is facilitated by the uniformly thick, smooth, flat, planar lower portion 14, through which the imaging light is transmitted with minimal or uniform diffraction.

As further seen in FIGS. 3 and 4, the upper retainer portion 12 is adapted to receive and position various monitoring sensors that can be connected to remote monitors for measuring various physiological parameters of a live rodent or other specimen.

For example, a hollow cylindrical electrocardiogram (ECG) pocket 84 over one or both upper rear leg cavities 32 is sized to closely fit and position a standard circular ECG sensor pad. A narrow channel 86 communicates with and extends rearwardly from each pocket 84 to the rear edge 88 of the upper retainer portion 12 for accommodating, positioning and retaining the electrical wires or leads connected to the ECG sensor pads.

A somewhat larger channel 90 extends rearwardly from the rump and hip region 80 to the rear edge 88 for accommodating, positioning and retaining a hollow air tube. Such an air tube is typically connected to a respiratory sensor which typically takes the form of a small pillow or bladder positioned against or under the chest of the rodent. As further seen in FIG. 4, an electrical lead channel 86 from one of the rear leg ECG pockets 84 can enter the larger channel 90 and exit the upper retainer portion 12 through channel 90.

An additional ECG pocket 84 can be formed over one or both of the upper front leg cavities 24. An electrical lead channel 86 can extend from this front pocket 84 to a rear ECG pocket 84, and then run rearwardly to rear edge 88 through channel 90, as shown.

A nose and mouth chamber 73 in the form of a semi cylindrical arch is formed on and openly communicates with the front end of the head cavity 20 for receiving hollow tubing and electrical leads as discussed above. As seen in FIG. 3, holes or ports 75, 79 are formed through front wall 77 of chamber 73 for the passage of such tubing and/or wires.

The upper retainer portion 12 of FIG. 4 is further formed with an injection port 94 leading through a channel 96 to the base of tail cavity 36. A hypodermic needle can be inserted through port 94 and channel 96 to administer various injections to a specimen within the specimen holder 10.

One or more hollow, tubular cylindrical sockets 98 are formed in the upper retainer portion 12 for receiving, with a snug sliding press fit, one or more complementary-shaped hollow plugs or pegs 100 provided on the lower retainer portion 14. Plugs 100 can be formed with chamfered top edges 102 to facilitate insertion into the cylindrical sockets 98. Because the plug 100 and socket 98 interconnection is typically designed with a tight fit, notches 104 (FIG. 3) are formed in the front 105 and rear 106 peripheral edges of the lower retainer 14. Notches 104 allow the front edge 107 and rear edge 88 of the upper retainer portion 12 to be grasped and peeled upwardly and somewhat inwardly to separate the plugs 100 from the sockets 98 and thereby gain access to the internal cavity 15 and any specimen positioned within the cavity 15.

Figure 5:
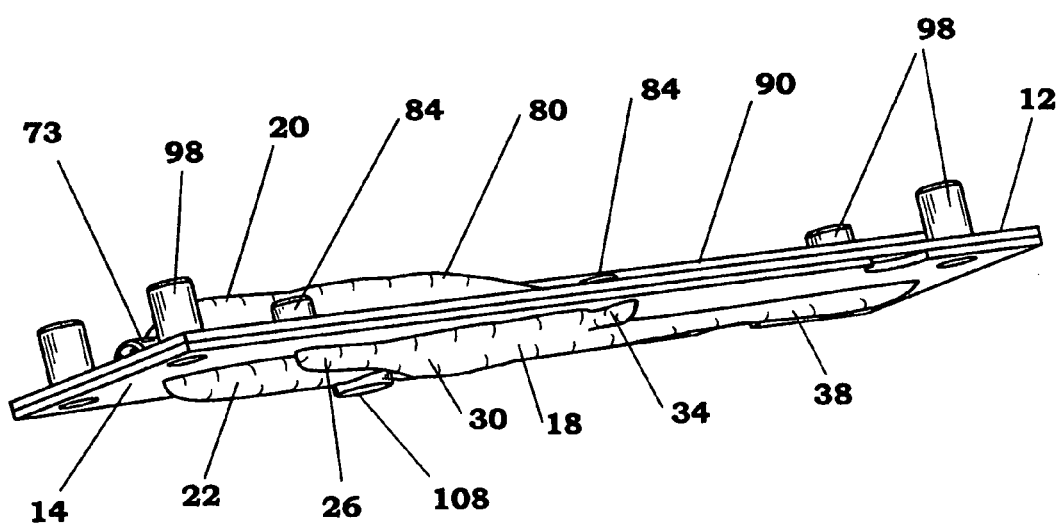
FIG. 5 is a bottom perspective view of another embodiment of the invention wherein the bottom or lower retainer is contoured to receive the bottom or lower portion of a specimen.

While the embodiment of FIGS. 3 and 4 includes a substantially planar lower retainer portion 14, the embodiment of FIG. 5 includes a lower retainer portion 14 formed with a contoured lower cavity 18 for receiving the lower portion of a rodent or other specimen. A cylindrical pocket 108 is formed in the central portion of the lower retainer portion 14 for receiving and positioning a respiratory sensor against the chest of a rodent or other specimen.

Figure 6:
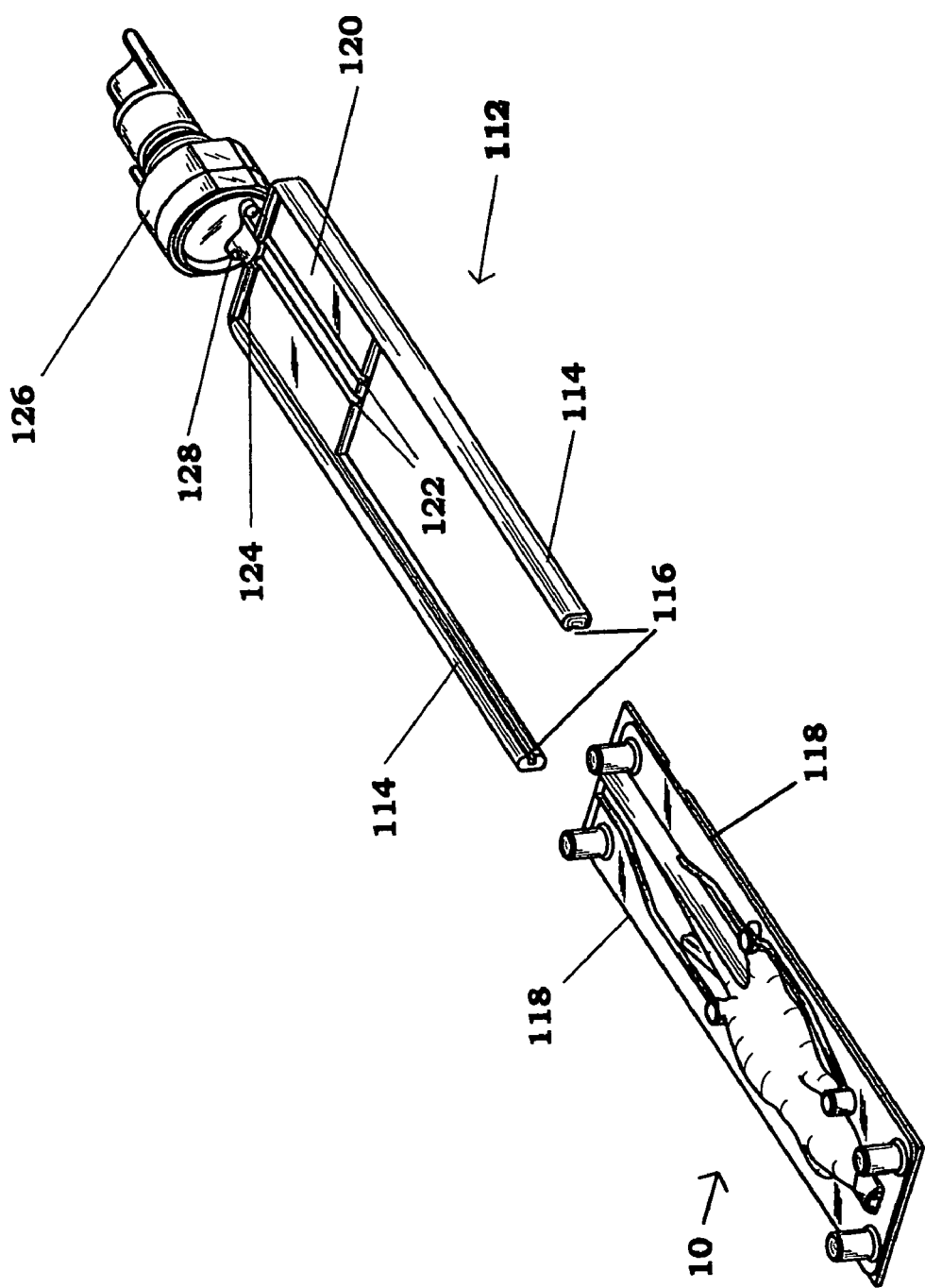
FIG. 6 is an exploded perspective view of a mounting tray for mounting a specimen holder to a connector.

As seen in FIG. 6, a fixture in the form of a slotted tray 112 is provided to slidably and removably receive a complete holder 10 with a slotted or tongue-and-groove interconnection. Tray 112 includes a pair of parallel side rails 114 each having a groove or slot 116 formed therein for tightly receiving the lateral edges 118 of holder 10. A rear support platform 120 extends between the rear ends of side rails 114 to rigidify the tray 112.

One or more channels 122 are formed in the top surface of platform 120. Channels 122 extend rearwardly through rear wall 124 which serves, to abut and accurately seat holder 10 within tray 112. Channels 122 are positioned to communicate with fluid ports formed on a specialized male connector 126.

Figure 7:
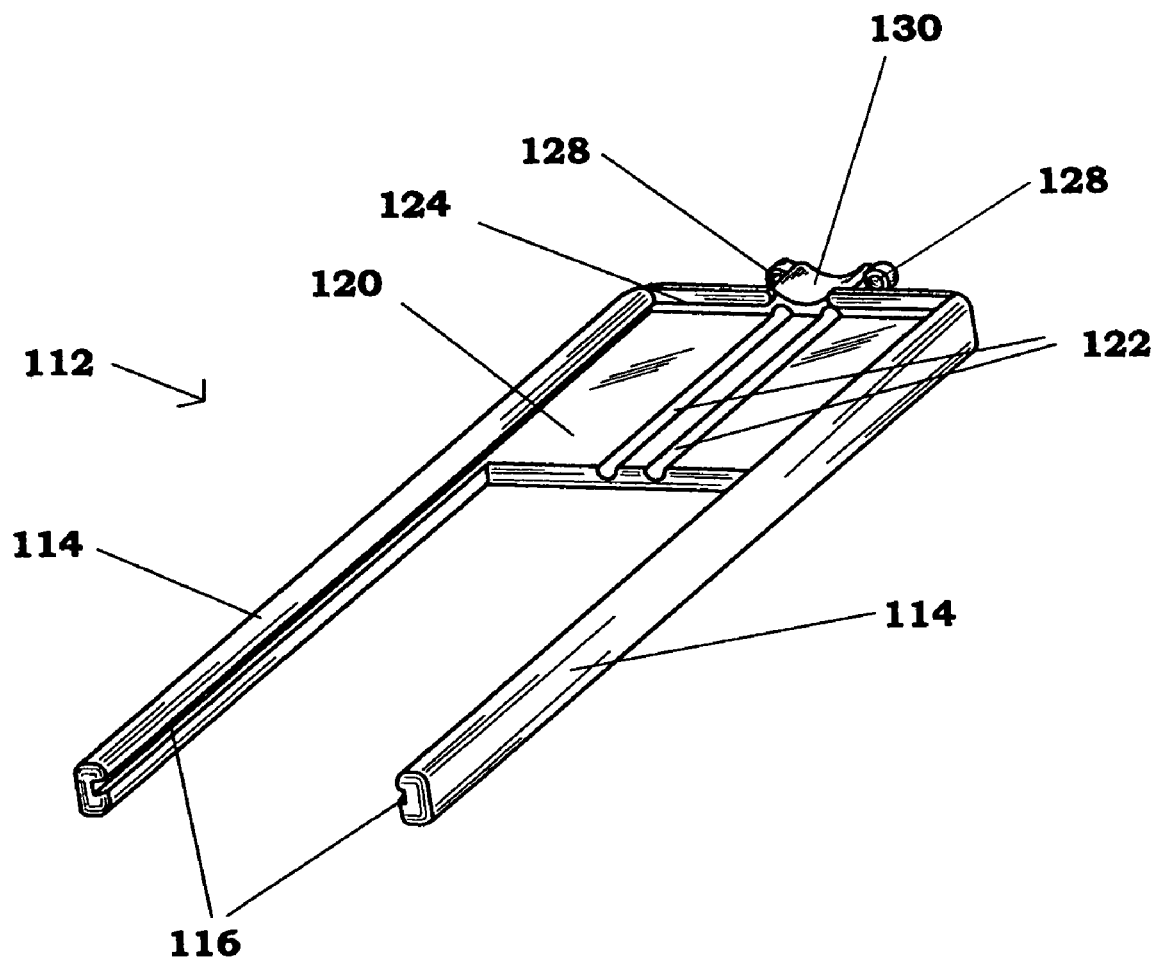
FIG. 7 is an enlarged perspective view of the mounting tray of FIG. 6.

Various gasses such as warm air can be introduced into the internal cavity 15 of holder 10 via connector 126 and channels 122. As best seen in FIG. 7, a pair of eyelets 128 is formed on opposite sides of an electrical lead wire support trough 130 extending rearwardly from rear wall 124. Plastic screws or other fasteners can be inserted through eyelets 128 and threaded into the connector 126 to anchor and fix the tray 112 to the connector 126. Connector 126 is adapted to accurately connect to a positioning assembly in an imaging machine.

Figure 8:
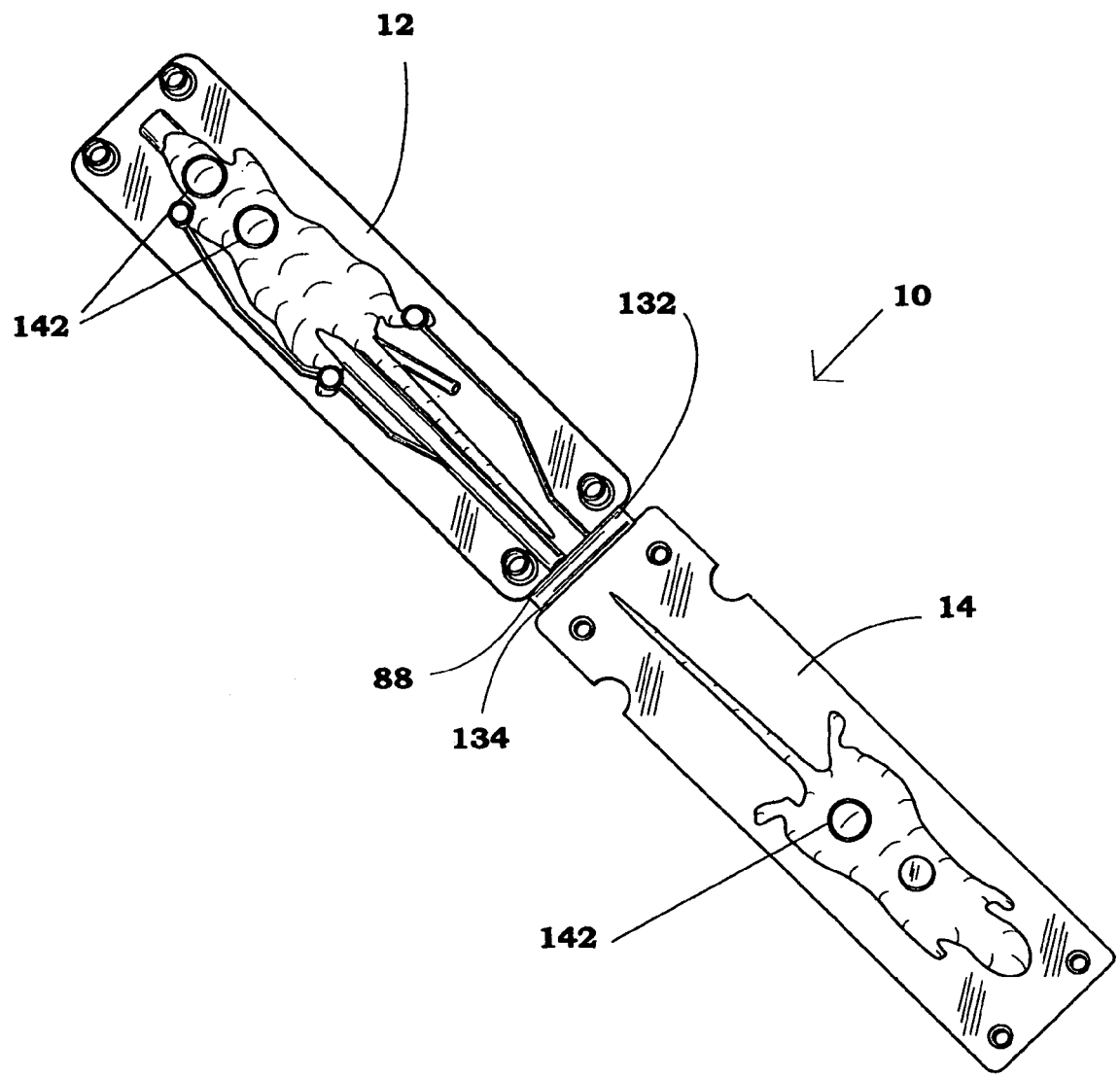
FIGS. 8 and 9 are schematic top plan views of one-piece specimen holders formed with plastic hinges and surface coils.
Figure 9:
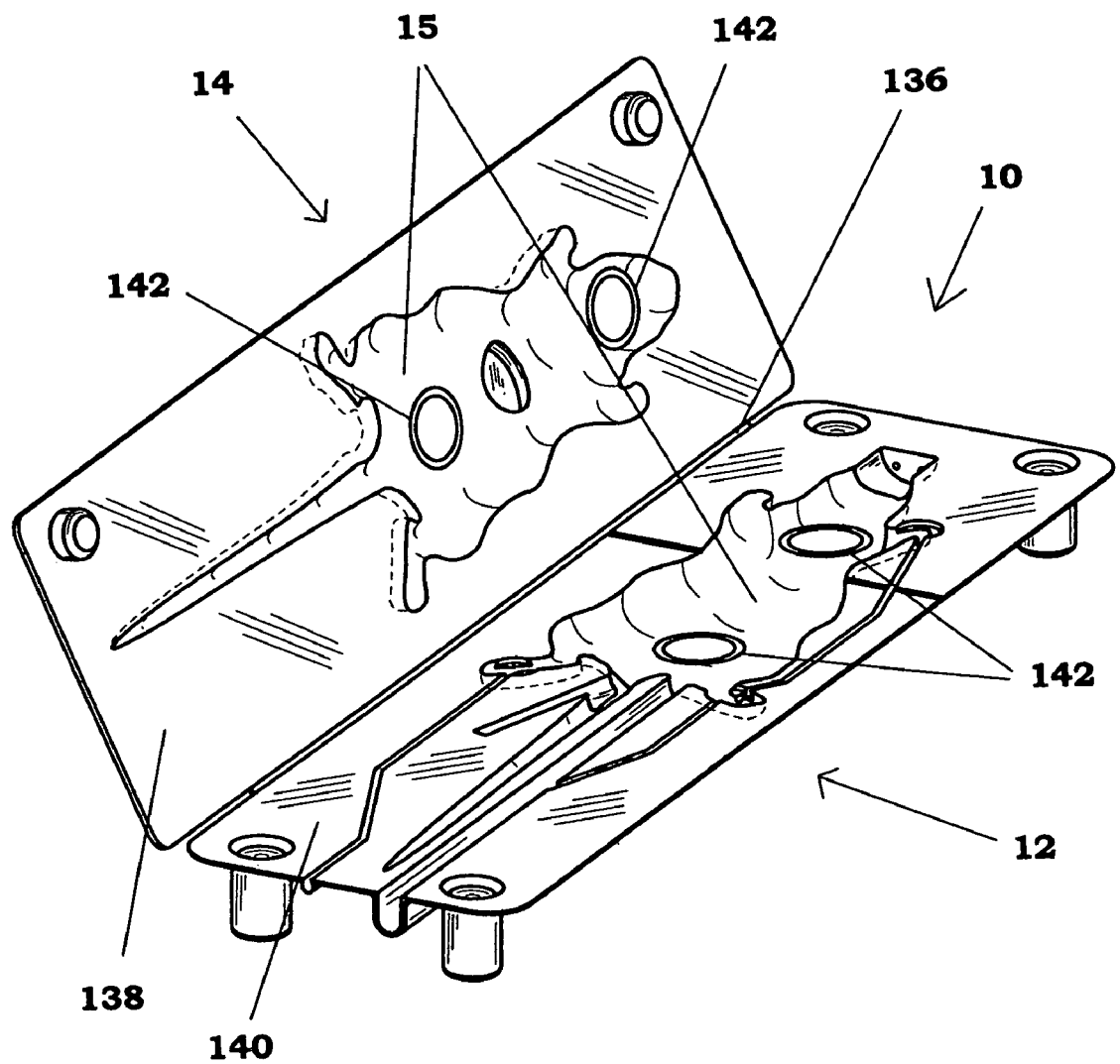

As seen in FIGS. 8 and 9, the two retainer portions 12, 14 may be formed integrally and homogenously from a single sheet of plastic in a single mold. A flexible living hinge 132 can be formed between longitudinal end portions 88, 134 as shown in FIG. 8. This provides for an economical one-piece construction which can be opened and closed in the manner of a clamshell.

A similar flexible living hinge 136 as shown in FIG. 9 can be formed between side edges 138, 140 of retainer portions 12, 14. A simple pivoting or folding action along hinge 136 serves to open and close cavity 15.

As further seen in FIGS. 8 and 9, one or more surface coils 142 can be carried by one or both of the retainer portions 12, 14 on either the interior or exterior surfaces thereof. Surface coils 142 can be located to align over any particular area of the specimen, such as the heart or brain, to increase the clarity of the image produced in that area. The surface coils 142 can be applied as a thin non-ferrous metal foil, such as a copper foil, either individually or in a pattern or array of coils over the retainer 10. Adhesives can be used to bond the surface coils 142 to the plastic retainer portions 12, 14 or virtually any metal deposition technique can be used.

For example, thick and thin film deposition can be used, as well as other vapor deposition techniques. Etching techniques such as those used in the fabrication of circuit boards and computer chips can also be used. While the surface coils 142 are shown as annular hoops, such as circles and ovals, virtually any shape of surface coil can be mounted or formed on the retainer portions 12, 14.

Because each half portion 12, 14 can be molded or otherwise formed from inexpensive plastic materials such as polycarbonate, the specimen holders 10 may, if desired, be economically discarded after use. This eliminates cleaning and decontamination of the holder 10 and reduces the chance of contact and contamination between the specimen and laboratory technicians. The internal cavities 15 may be formed in standard incremental sizes (lengths, widths and heights) in the manner of shoe sizes to nominally fit corresponding sized specimens.

There has been disclosed heretofore the best embodiment of the invention presently contemplated. Obviously, numerous modifications and variations of the present invention are possible in light of the above teachings. It is therefore to be understood that within the scope of the appended claims, the invention may be practiced otherwise than as specifically described herein.

What is claimed is:

1. An animal holder for securely holding a laboratory animal in a predetermined position in an imaging machine, the laboratory animal having a head, first and second front legs, first and second rear legs, a body including an upper body portion including a back and rump portion and a lower body portion, said holder comprising:

a first animal restraining portion comprising first and second front recesses securely receiving the laboratory animal's first and second front legs, first and second rear recesses securely receiving the laboratory animal's first and second rear legs, a head restraining portion receiving and supporting the laboratory animal's head and a body receiving portion receiving and supporting at least one of the upper body portion and the lower body portion of the laboratory animal;

a second animal restraining portion coacting with said first animal restraining portion so as to define an animal retention cavity there between, said first and second restraining portions configured to clamp the laboratory animal's first and second front legs in a predetermined position on said holder, to clamp the laboratory animal's first and second rear legs in a predetermined position in said holder, to clamp the laboratory animal's head in a predetermined position in the holder, and to clamp the laboratory animal's body in a predetermined position in the holder; and a hermetic seal provided between said first and second animal restraining portions preventing contamination of said animal retention cavity.

2. An animal holder, comprising:

a first portion formed of a sheet of plastic material;

a second portion formed of a sheet of plastic material;

said first and second portions defining an internal cavity shaped to clamp an animal tightly within said internal cavity; and a nose and mouth chamber formed on said animal holder and extending from said internal cavity and in fluid communication with said internal cavity, said nose and mouth chamber having a port formed therethrough for the passage gas.

3. An animal holder for securely holding a laboratory animal in a predetermined position in an imaging machine, the laboratory animal having a head, first and second front legs, first and second rear legs, a body including an upper body portion including a back and rump portion and a lower body portion, said holder comprising:

a first animal restraining portion comprising first and second front recesses securely receiving the laboratory animals first and second front legs, first and second rear recesses securely receiving the laboratory animal's first and second rear legs, a head restraining portion receiving and supporting the laboratory animal's head and a body receiving portion receiving and supporting at least one of the upper body portion and the lower body portion of the laboratory animal;

a second animal restraining portion coacting with said first animal restraining portion so as to define an animal retention cavity there between, said first and second restraining portions configured to clamp the laboratory animal's first and second front legs in a predetermined position on said holder, to clamp the laboratory animal's first and second rear legs in a predetermined position in said holder, to clamp the laboratory animal's head in a predetermined position in the holder, and to clamp the laboratory animal's body in a predetermined position in the holder; and a nose cavity defined between said first and second animal restraining portions and disposed adjacent to said head restraining portion, and a port formed through said animal holder and communicating with said nose cavity.

4. An animal holder for securely holding a laboratory animal in a predetermined position in an imaging machine, the laboratory animal having a head, first and second front legs, first and second rear legs, a body including an upper body portion including a back and rump portion and a lower body portion, said holder comprising:

a first animal restraining portion comprising first and second front recesses securely receiving the laboratory animals first and second front legs, first and second rear recesses securely receiving the laboratory animal's first and second rear legs, a head restraining portion receiving and supporting the laboratory animal's head and a body receiving portion receiving and supporting at least one of the upper body portion and the lower body portion of the laboratory animal;

a second animal restraining portion coacting with said first animal restraining portion so as to define an animal retention cavity there between, said first and second restraining portions configured to clamp the laboratory animal's first and second front legs in a predetermined position on said holder, to clamp the laboratory animal's first and second rear legs in a predetermined position in said holder, to clamp the laboratory animal's head in a predetermined position in the holder, and to clamp the laboratory animal's body in a predetermined position in the holder; and wherein said first animal restraining portion comprises a sheet of plastic material formed to resemble at least a portion of the laboratory animal.

5. The animal holder of claim 4, further comprising a permanent connection between said first and second animal restraining portions permanently encapsulating a laboratory animal within said animal retention cavity.

6. The animal holder of claim 4, wherein said first and second animal restraining portions encapsulate a laboratory animal.

7. The animal holder of claim 4, further comprising an injection port communicating with said animal retention cavity for administering an injection to a laboratory animal.

8. The animal holder of claim 4, further comprising a living hinge connecting said first and second animal restraining portions.

9. An animal holder for securely holding a laboratory animal in a predetermined position in an imaging machine, the laboratory animal having a head, first and second front legs, first and second rear legs, a body including an upper body portion including a back and rump portion and a lower body portion, said holder comprising:

a first animal restraining portion comprising first and second front recesses securely receiving the laboratory animals first and second front legs, first and second rear recesses securely receiving the laboratory animal's first and second rear legs, a head restraining portion receiving and supporting the laboratory animal's head and a body receiving portion receiving and supporting at least one of the upper body portion and the lower body portion of the laboratory animal;

a second animal restraining portion coacting with said first animal restraining portion so as to define an animal retention cavity there between, said first and second restraining portions configured to clamp the laboratory animal's first and second front legs in a predetermined position on said holder, to clamp the laboratory animal's first and second rear legs in a predetermined position in said holder, to clamp the laboratory animal's head in a predetermined position in the holder, and to clamp the laboratory animal's body in a predetermined position in the holder; and wherein said second animal restraining portion comprises a planar sheet of plastic material defining a portion of said animal retention cavity.

10. An animal holder for securely holding a laboratory animal in a predetermined position in an imaging machine, the laboratory animal having a head, first and second front legs, first and second rear legs, a body including an upper body portion including a back and rump portion and a lower body portion, said holder comprising:
- a first animal restraining portion comprising first and second front recesses securely receiving the laboratory animals first and second front legs, first and second rear recesses securely receiving the laboratory animal's first and second rear legs, a head restraining portion receiving and supporting the laboratory animal's head and a body receiving portion receiving and supporting at least one of the upper body portion and the lower body portion of the laboratory animal;
- a second animal restraining portion coacting with said first animal restraining portion so as to define an animal retention cavity there between, said first and second restraining portions configured to clamp the laboratory animal's first and second front legs in a predetermined position on said holder, to clamp the laboratory animal's first and second rear legs in a predetermined position in said holder, to clamp the laboratory animal's head in a predetermined position in the holder, and to clamp the laboratory animal's body in a predetermined position in the holder; and
- a bite bar provided adjacent said head restraining portion and engageable with a laboratory animal's teeth.

11. An animal holder for securely holding a laboratory animal in a predetermined position in an imaging machine, the laboratory animal having a head, first and second front legs, first and second rear legs, a body including an upper body portion including a back and rump portion and a lower body portion, said holder comprising:
- a first animal restraining portion comprising first and second front recesses securely receiving the laboratory animals first and second front legs, first and second rear recesses securely receiving the laboratory animal's first and second rear legs, a head restraining portion receiving and supporting the laboratory animal's head and a body receiving portion receiving and supporting at least one of the upper body portion and the lower body portion of the laboratory animal;
- a second animal restraining portion coacting with said first animal restraining portion so as to define an animal retention cavity there between, said first and second restraining portions configured to clamp the laboratory animal's first and second front legs in a predetermined position on said holder, to clamp the laboratory animal's first and second rear legs in a predetermined position in said holder, to clamp the laboratory animal's head in a predetermined position in the holder, and to clamp the laboratory animal's body in a predetermined position in the holder; and
- a gasket provided between said first and second animal restraining portions.

12. An animal holder for securely holding a laboratory animal in a predetermined position in an imaging machine, the laboratory animal having a head, first and second front legs, first and second rear legs, a body including an upper body portion including a back and rump portion and a lower body portion, said holder comprising:
- a first animal restraining portion comprising first and second front recesses securely receiving the laboratory animals first and second front legs, first and second rear recesses securely receiving the laboratory animal's first and second rear legs, a head restraining portion receiving and supporting the laboratory animal's head and a body receiving portion receiving and supporting at least one of the upper body portion and the lower body portion of the laboratory animal;
- a second animal restraining portion coacting with said first animal restraining portion so as to define an animal retention cavity there between, said first and second restraining portions configured to clamp the laboratory animal's first and second front legs in a predetermined position on said holder, to clamp the laboratory animal's first and second rear legs in a predetermined position in said holder, to clamp the laboratory animal's head in a predetermined position in the holder, and to clamp the laboratory animal's body in a predetermined position in the holder; and
- a filter in fluid communication with said animal retention cavity.

13. An animal holder for securely holding a laboratory animal in a predetermined position in an imaging machine, the laboratory animal having a head, first and second front legs, first and second rear legs, a body including an upper body portion including a back and rump portion and a lower body portion, said holder comprising:
- a first animal restraining portion comprising first and second front recesses securely receiving the laboratory animals first and second front legs, first and second rear recesses securely receiving the laboratory animal's first and second rear legs, a head restraining portion receiving and supporting the laboratory animal's head and a body receiving portion receiving and supporting at least one of the upper body portion and the lower body portion of the laboratory animal;
- a second animal restraining portion coacting with said first animal restraining portion so as to define an animal retention cavity there between, said first and second restraining portions configured to clamp the laboratory animal's first and second front legs in a predetermined position on said holder, to clamp the laboratory animal's first and second rear legs in a predetermined position in said holder, to clamp the laboratory animal's head in a predetermined position in the holder, and to clamp the laboratory animal's body in a predetermined position in the holder; and
- a pocket formed in said animal retention cavity and configured to receive a sensor.

14. An animal holder for securely holding a laboratory animal in a predetermined position in an imaging machine, the laboratory animal having a head, first and second front legs, first and second rear legs, a body including an upper body portion including a back and rump portion and a lower body portion, said holder comprising:
- a first animal restraining portion comprising first and second front recesses securely receiving the laboratory animals first and second front legs, first and second rear recesses securely receiving the laboratory animal's first and second rear legs, a head restraining portion receiving and supporting the laboratory animal's head and a body receiving portion receiving and supporting at least one of the upper body portion and the lower body portion of the laboratory animal;
- a second animal restraining portion coacting with said first animal restraining portion so as to define an animal retention cavity there between, said first and second restraining portions configured to clamp the laboratory animal's first and second front legs in a predetermined position on said holder, to clamp the laboratory animal's first and second rear legs in a predetermined position in said holder, to clamp the laboratory animal's head in a predetermined position in the holder, and to clamp the laboratory animal's body in a predetermined position in the holder; and a tray removably receiving said animal holder and a connector provided on said tray, said connector configured to connect said animal holder to an imaging machine.

15. An animal holder for securely holding a laboratory animal in a predetermined position in an imaging machine, the laboratory animal having a head, first and second front legs, first and second rear legs, a body including an upper body portion including a back and rump portion and a lower body portion, said holder comprising:

a first animal restraining portion comprising first and second front recesses securely receiving the laboratory animals first and second front legs, first and second rear recesses securely receiving the laboratory animal's first and second rear legs, a head restraining portion receiving and supporting the laboratory animal's head and a body receiving portion receiving and supporting at least one of the upper body portion and the lower body portion of the laboratory animal;

a second animal restraining portion coacting with said first animal restraining portion so as to define an animal retention cavity there between, said first and second restraining portions configured to clamp the laboratory animal's first and second front legs in a predetermined position on said holder, to clamp the laboratory animal's first and second rear legs in a predetermined position in said holder, to clamp the laboratory animal's head in a predetermined position in the holder, and to clamp the laboratory animal's body in a predetermined position in the holder; and a surface coil disposed on said animal holder adjacent to said animal retention cavity and configured to increase image clarity of an image of a laboratory animal produced by an imaging machine.

\* \* \* \* \*